(12) United States Patent
Manoj et al.

(10) Patent No.: US 8,176,492 B2
(45) Date of Patent: May 8, 2012

(54) SYNCHRONOUS ADAPTION OF ASYNCHRONOUS MODULES

(75) Inventors: Jose K. Manoj, Lilburn, GA (US); Atul Mukker, Suwanee, GA (US)

(73) Assignee: LSI Corporation, Milpitas, CA (US)

( * ) Notice: Subject to any disclaimer, the term of this patent is extended or adjusted under 35 U.S.C. 154(b) by 1061 days.

(21) Appl. No.: 12/046,603

(22) Filed: Mar. 12, 2008

(65) Prior Publication Data

US 2009/0235259 A1    Sep. 17, 2009

(51) Int. Cl.
- G06F 9/46 (2006.01)
- G06F 5/00 (2006.01)
- G06F 13/12 (2006.01)
- G06F 13/28 (2006.01)

(52) U.S. Cl. ............... 718/101; 710/48; 710/58; 710/71; 711/114; 711/154

(58) Field of Classification Search .......................... None
See application file for complete search history.

(56) References Cited

U.S. PATENT DOCUMENTS

| | | | |
|---|---|---|---|
| 5,923,896 A * | 7/1999 | Young | 710/5 |
| 6,085,277 A * | 7/2000 | Nordstrom et al. | 710/263 |
| 6,219,727 B1 * | 4/2001 | Kailash et al. | 710/48 |
| 6,829,663 B1 * | 12/2004 | Ghaffari et al. | 710/71 |
| 2005/0071580 A1 * | 3/2005 | LeClerg et al. | 711/154 |

* cited by examiner

*Primary Examiner* — Meng An
*Assistant Examiner* — Bing Zhao
(74) *Attorney, Agent, or Firm* — Luedeka Neely Group, P.C.

(57) ABSTRACT

A program disposed on a computer readable medium, having a main program with a first routine for issuing commands in an asynchronous manner and a second routine for determining whether the commands have been completed in an asynchronous manner. An auxiliary program adapts the main program to behave in a synchronous manner, by receiving control from the first routine, waiting a specified period of time with a wait routine, passing control to the second routine to determine whether any of the commands have been completed during the specified period of time, receiving control back from the second routine, and determining whether all of the commands have been completed. When all of the commands have not been completed, then the auxiliary program passes control back to the wait routine. When all of the commands have been completed, then the auxiliary program ends.

3 Claims, 2 Drawing Sheets

SYNCHRONOUS ADAPTION OF ASYNCHRONOUS MODULES

FIELD

This invention relates to the field of computer programming. More particularly, this invention relates to adapting an existing asynchronous module to run synchronously.

BACKGROUND

Two different paradigms are used for the execution of a program (including implementation without limitation in software, firmware, and hardware forms)—synchronous operation and asynchronous operation. Synchronous operation is where the program issues a command, such as to a physical drive, and then keeps checking for the interrupt in the interrupt status register until the presence of the interrupt in the register indicates that the command has completed, either successfully or unsuccessfully, before continuing with the operation of the program. In this case, all of the external commands are accomplished in the same context. For example, a synchronous RAID program waits for the drive to complete its read/write/functional operation before continuing with other operations.

Asynchronous operation is where the program issues a command, such as to a physical drive, and then does not expect the status of the command to be returned prior to proceeding with other operations. In this case, all of the external commands might not be accomplished in the same context. For example, an asynchronous RAID program issues a command to a physical drive, but then does not wait for the interrupt before continuing with other operations. In this case, the program merely expects an interrupt service routine call from the drive sometime after the drive completes its read/write/functional operation.

In RAID driver programs, for example, some tasks are required to be executed in a synchronous mode. A synchronous operation is mainly required during load and shut down, when the upper layers of the operating environment might not provide the multi-threaded execution path that is required for asynchronous operations. Thus, all of the load and unload processes typically complete synchronously. Some drivers are not even allowed to have interrupts at load and unload times, due to environment limitations.

However, during normal run time, a program should function in a asynchronous mode, so as to produce maximum throughput and to reduce system resource usage. Thus, some device drivers implement some commands in synchronous mode and other commands in asynchronous mode, or all commands in both modes depending upon when they are run. For example, some RAID device drivers implement commands in both synchronous mode and asynchronous mode. However, other drivers do not implement any asynchronous commands, but use only synchronous commands.

Unfortunately, drivers that implement both synchronous and asynchronous modules in a standard manner require more time to develop and validate, and tend to be bulky and difficult to manage. Drivers that only utilize synchronous mode tend to be inefficient.

What is needed, therefore, is a system that overcomes problems such as those described above, at least in part.

SUMMARY

The above and other needs are met by a program disposed on a computer readable medium, having a main program with a first routine for issuing commands in an asynchronous manner and a second routine for determining whether the commands have been completed in an asynchronous manner. An auxiliary program adapts the main program to behave in a synchronous manner, by receiving control from the first routine, waiting a specified period of time with a wait routine, passing control to the second routine to determine whether any of the commands have been completed during the specified period of time, receiving control back from the second routine, and determining whether all of the commands have been completed. When all of the commands have not been completed, then the auxiliary program passes control back to the wait routine. When all of the commands have been completed, then the auxiliary program ends.

In this manner, a main program can be written completely in an asynchronous domain, and then those routines that would not function properly in an asynchronous manner can be adapted with the auxiliary program to behave in a synchronous manner. This provides a very simple programming path for the main program, and a simple and small update to change desired routines to synchronous operation with the use of the relatively small and simple auxiliary program.

In various embodiments, the auxiliary program sets a flag upon receiving control from the first routine, and determines whether all of the commands have been completed by detecting when the flag has been cleared. the main program is a RAID driver. the program runs in an operating environment that doesn't support asynchronous operation of programs.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein.

DETAILED DESCRIPTION

Various embodiments of the present invention provide a design for a simulated interrupt status request module that forces commands to be completed synchronously, even though the underlying program has been written for asynchronous operation. In this manner, a program can be written using all asynchronous modules, and then those modules that would not function properly if executed asynchronously can be quickly and easily updated with the simulation module to run synchronously. The simulation module reduces the development time that is required to create a synchronous module, and enables the use of an existing asynchronous module when creating a synchronous module.

These embodiments allow any asynchronous command module to complete synchronously by adding a small simulation module to the command module. The embodiments make use of the fact that synchronous and asynchronous commands both depend upon the interrupt status as delivered to determine the success of failure of the completed commands.

Figure 1:
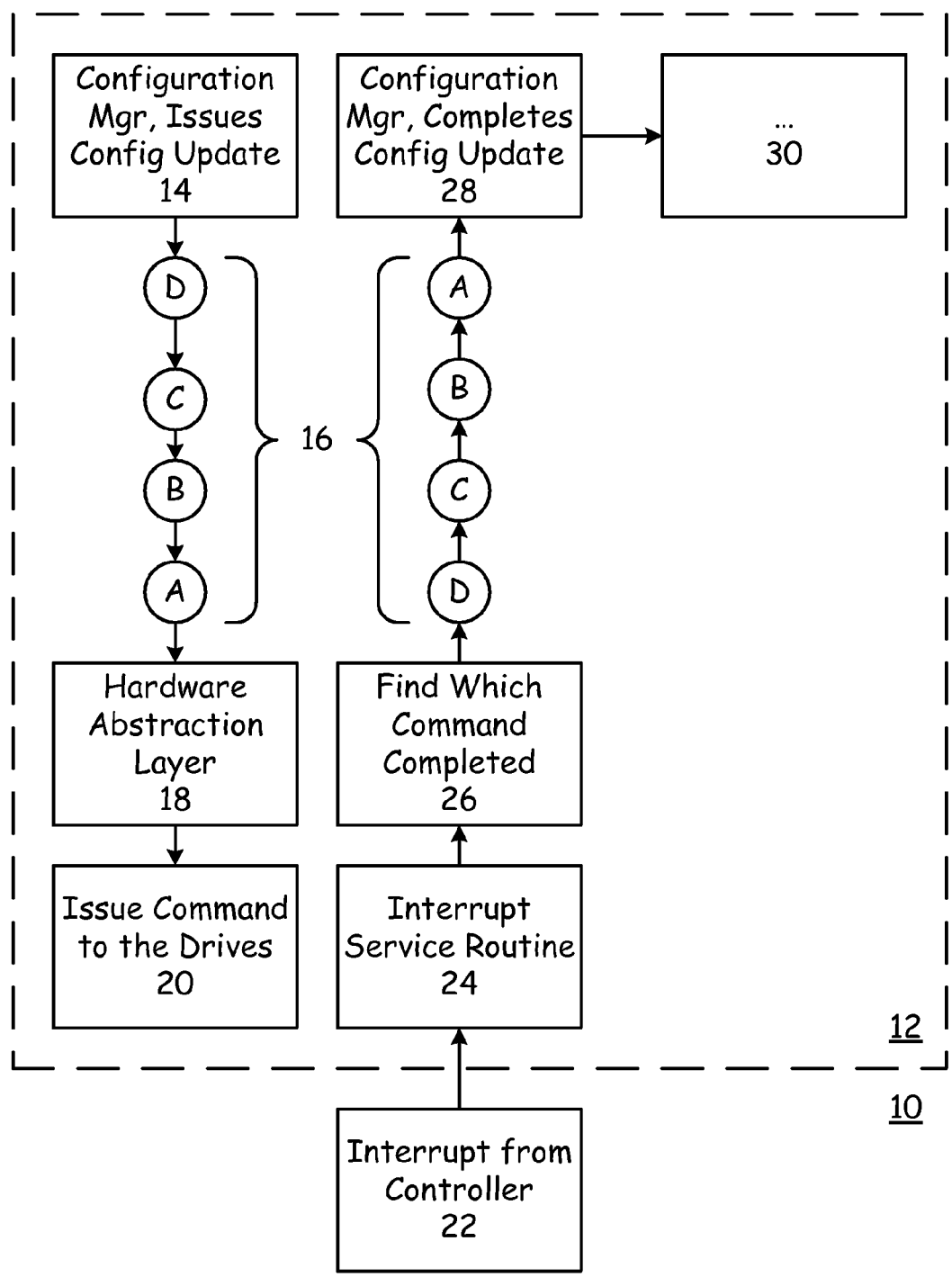
FIG. 1 is an embodiment of an asynchronous program module according to an embodiment of the present invention.

With reference now to FIG. 1, the embodiment of a configuration update manager 12 for a RAID is depicted as an example, in a program 10. In this example, An asynchronous module 12 issues configuration commands to a RAID. A configuration manager issues the commands A, B, C, and D 16, as given in block 14. These commands 16 are received by the hardware abstraction layer 18 of the operating environment, as given in block 18, which issues the commands to the drives, as given in block 20. The routine that issues the commands 16 as just described runs within the module 12 separately from the routine that checks to see whether the commands 16 have executed, which is next described.

The configuration update commands 16 A, B, C and D are issued to the drives at time T1, and the interrupt controller 22 (a device external to the asynchronous program 12) raises an interrupt for each command at different times as each one is completed. The operating system calls an interrupt service routine 24 of the program 12 when an interrupt is delivered from the controller 22. The interrupt service routine 24 finds out which command 16 completed, and informs the configuration manager about the completion of the command 16 with a proper command status, as given in block 28. The configuration manager completes the configuration update program 12, as given in block 30, after all of the commands 16 have completed.

Figure 2:
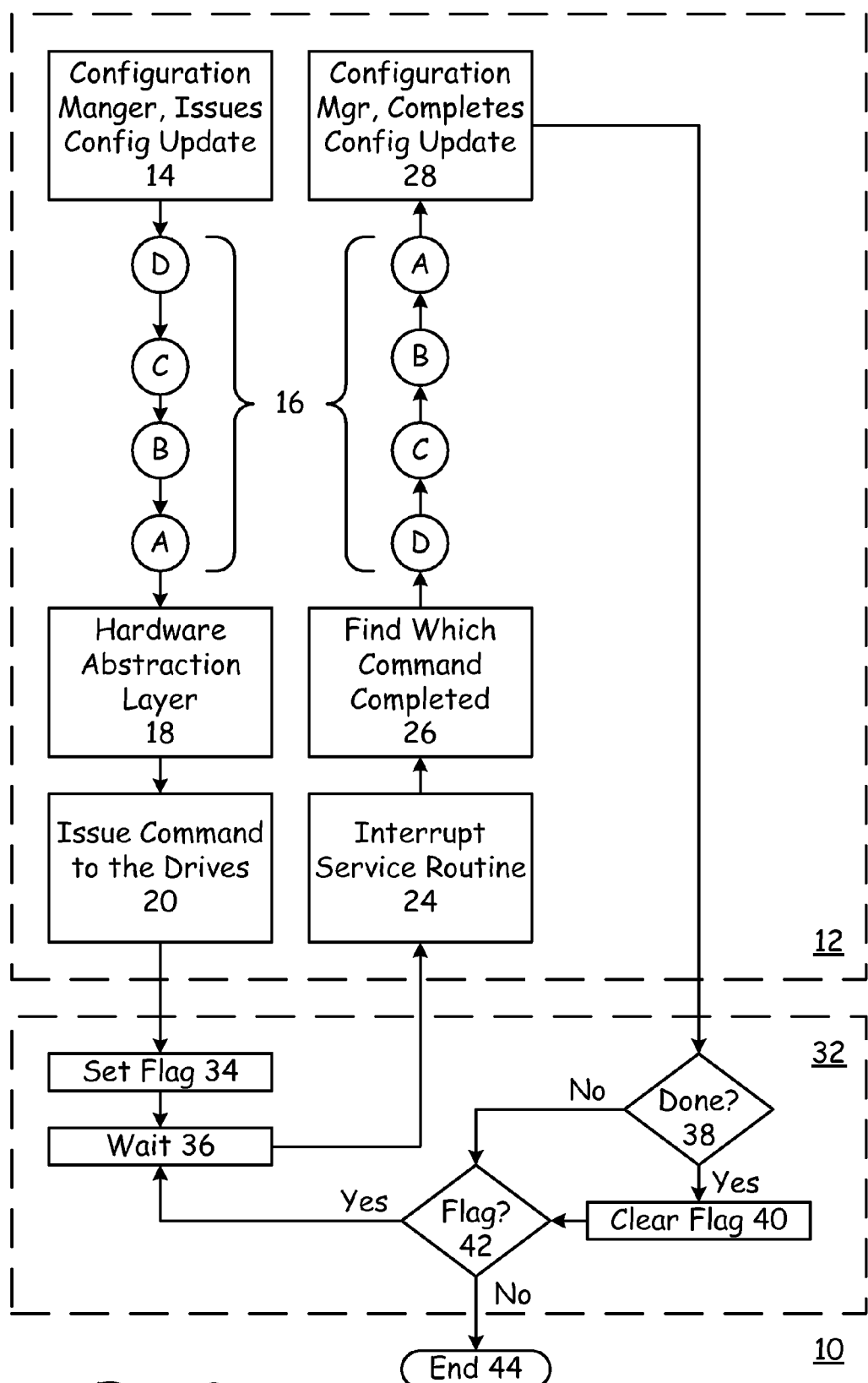
FIG. 2 is an embodiment of an asynchronous program module that has been adapted to operate in a synchronous mode with a simulation module according to an embodiment of the present invention.

FIG. 2 depicts an additional simulation module 32, exemplifying how the same configuration update 12 is completed synchronously. This design makes use of the asynchronous module 12, with minimal changes to patch in the simulation module 32.

To make the program 12 asynchronous, the block 20 passes control to the simulation module 32 after issuing the commands. The entry point for the simulation module 32 is block 34, where a flag is set. Control next passes to block 36, where a wait routine is implemented for some desired length of time, such as ten microseconds. At the end of the wait, the simulation module 32 hands control back to the asynchronous program 12, at the interrupt service routine 24, which enters the standard routine for the program 12 to determine whether any of the commands 16 have executed.

At the end of that standard routine, control is passed back to the simulation module 32 at decision block 38, which determines whether all of the commands 16 have completed. If they have not, then control passes to decision block 42, which determines if the flag set in block 34 is still set. If the flag is still set, then control passes again to the wait routine 36, and proceeds as described above. If all of the commands 16 have completed, then decision block 38 passes control to block 40, where the flag is cleared. Then, upon entry to the decision block 42, control passes to the end routine 44. In some embodiments, this could constitute passing control to the routines 30 as depicted in FIG. 1.

The simulation module 32 blindly calls the interrupt service routine 24 of the program 12 at a specific interval until the configuration update completes. The interrupt service routine 24 always checks for the interrupt, and if the actual interrupt is not found it won't do anything further. By simulating the interrupt service routine, there is no need to wait for each command 16 to complete separately, and thereby an elaborate synchronous configuration update can be avoided.

The implementation of the simulation module 32 is very easy, as it only requires two hooks into the asynchronous program 12, one where the commands 16 are issued, as given in block 20, and another at the end of the interrupt service routine, as given in block 28. Thus, a relatively simple asynchronous program 12 can be adapted as desired to be a synchronous program 10 with the addition of the small simulation module 32.

The foregoing description of preferred embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A program disposed on a non-transitory computer readable storage medium, the program comprising:
   a main program having,
   a first routine for issuing commands in an asynchronous manner, and
   a second routine for determining whether the commands have been completed in an asynchronous manner,
   an auxiliary program for adapting the main program to behave in a synchronous manner, by,
   a) receiving control from the first routine and setting a flag,
   b) waiting a specified period of time with a wait routine,
   c) passing control to the second routine to determine whether any of the commands have been completed during the specified period of time,
   d) receiving control back from the second routine,
   e) determining whether all of the commands have been completed,
   f) selectively clearing the flag when all of the commands have been completed,
   g) checking whether the flag is still set,
   h) returning to step b) when the flag is still set, and
   i) ending when the flag has been cleared.

2. The program of claim 1, wherein the main program is a RAID driver.

3. The program of claim 1, wherein the program runs in an operating environment that doesn't support asynchronous operation of programs.

* * * * *